(12) United States Patent
Zhou et al.

(10) Patent No.: US 11,183,677 B2
(45) Date of Patent: Nov. 23, 2021

(54) PREPARATION METHOD AND PRODUCT OF LITHIUM-ION BATTERY ELECTRODE SHEET WITH VERTICAL VENT STRUCTURES

(71) Applicant: HUAZHONG UNIVERSITY OF SCIENCE AND TECHNOLOGY, Hubei (CN)

(72) Inventors: Huamin Zhou, Hubei (CN); Yun Zhang, Hubei (CN); Yunming Wang, Hubei (CN); Maoyuan Li, Hubei (CN); Ruoyu Xiong, Hubei (CN); Hui Yang, Hubei (CN); Bo Yan, Shanghai (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/211,846

(22) Filed: Mar. 25, 2021

(65) Prior Publication Data

US 2021/0210743 A1    Jul. 8, 2021

Related U.S. Application Data

(63) Continuation of application No. PCT/CN2020/116951, filed on Sep. 23, 2020.

(30) Foreign Application Priority Data

Dec. 6, 2019    (CN) .......................... 201911239819.2

(51) Int. Cl.
*H01M 4/04*    (2006.01)
*H01M 4/13*    (2010.01)
(Continued)

(52) U.S. Cl.
CPC ....... *H01M 4/0471* (2013.01); *H01M 4/0404* (2013.01); *H01M 4/139* (2013.01); *H01M 10/0525* (2013.01); *H01M 2004/021* (2013.01)

(58) Field of Classification Search
None
See application file for complete search history.

(56) References Cited

U.S. PATENT DOCUMENTS

2012/0177986 A1*  7/2012  Aida .................... H01G 11/20
                                                                429/188
2017/0012283 A1*  1/2017  Mizuno ................ H01M 4/139

FOREIGN PATENT DOCUMENTS

CN        105633350        6/2016
CN        105845872        8/2016
(Continued)

*Primary Examiner* — Jonathan Crepeau
*Assistant Examiner* — Angela J Martin
(74) *Attorney, Agent, or Firm* — JCIP Global Inc.

(57) ABSTRACT

A preparation method of a lithium-ion battery electrode sheet includes: adding a powdered thermal decomposition additive, an active material, a binder, and a conductive agent into a solvent according to a predetermined ratio and a specific order, performing continuous stirring until the solvent is uniformly mixed, obtaining an electrode slurry, coating the prepared and obtained electrode slurry onto a current collector to obtain a lithium-ion battery wet electrode sheet, and heating and drying the lithium-ion battery wet electrode sheet. The lithium-ion battery electrode sheet with the vertical vent structures is accordingly prepared and obtained. The product includes a current collector, an electrode coating layer, and a plurality of vertical vent structures which are uniformly distributed.

7 Claims, 3 Drawing Sheets

(51) Int. Cl.
*H01M 10/05* (2010.01)
*H01M 4/139* (2010.01)
*H01M 10/0525* (2010.01)
*H01M 4/02* (2006.01)

(56) References Cited

FOREIGN PATENT DOCUMENTS

| | | | | | |
|---|---|---|---|---|---|
| CN | 105845872 A | * | 8/2016 | ........ | H01M 10/0525 |
| CN | 108767195 | | 11/2018 | | |
| CN | 109860513 | | 6/2019 | | |
| CN | 110957470 | | 4/2020 | | |
| CN | 110957470 A | * | 4/2020 | ........ | H01M 10/0525 |
| JP | 2012169109 | | 9/2012 | | |

* cited by examiner

PREPARATION METHOD AND PRODUCT OF LITHIUM-ION BATTERY ELECTRODE SHEET WITH VERTICAL VENT STRUCTURES

CROSS-REFERENCE TO RELATED APPLICATION

The present application is a continuation of PCT International Application No. PCT/CN2020/116951, filed on Sep. 23, 2020, which claims priority under 35 U.S.C. Section 119(a) to China Patent Application No. 201911239819.2 filed on Dec. 6, 2019. Each of the above applications is hereby expressly incorporated by reference, in its entirety, into the present application.

BACKGROUND

Technical Field

The disclosure relates to the technical field of lithium-ion batteries, and in particular, relates to a preparation method and a product of a lithium-ion battery with vertical vent structures.

Description of Related Art

Owing to increasing demand for fast charging, high-power output, and other application scenarios, lithium-ion batteries are now required to exhibit high rate performance. Nevertheless, under high-current conditions, since the currently-available electrodes that the lithium-ions in the battery electrolyte are transmitted in are highly tortuous and porous, transmission of the lithium-ions is the least efficient and the weakest link in the overall dynamic process. This problem is more prominent especially for a high-load electrode sheet because its thickness or compaction density is greater, that is, it has a longer transmission path or a smaller transmission space (low porosity). Besides, due to the low transmission rate, a large lithium-ion concentration gradient is formed, so lithium precipitation is prone to occur on the side of the cathode electrode diaphragm, which increases the risk of short circuits in the battery. Therefore, development of an electrode exhibiting high performance and a less tortuous structure is an important issue.

In recent years, a new structure of the lithium-ion battery electrodes is proposed by researchers in academia. In addition to the conventional disordered holes (1 nm to 10 um), this kind of electrode also has vertical vents (aperture of approximately tens of microns) which are perpendicular to the electrode surface and are prepared through a specific method. When being transmitted, the lithium-ions in the electrolyte may be efficiently transmitted to the inside of the electrode through the less-tortuous and oriented vertical vents and then further penetrate into the active particles through the disordered holes on the side. In this way, the overall transmission efficiency of liquid ions in the porous electrode is greatly improved. Nevertheless, some existing preparation methods still stay in the laboratory stage, such as the proposed methods including the co-extrusion method, the gel freezing method, the magnetic material guiding method, the freezing and pouring method, etc. Problems such as high energy consumption, time-consuming, and high process difficulty may be found in these methods, so industrial popularity of these methods is low.

Therefore, a simple, highly-efficient, and low-cost method for preparing a lithium-ion battery electrode sheet with vertical vent structures is required in this field to satisfy industrial applications.

SUMMARY

According to the above technical defects or improvement requirements of the related art, the disclosure provides a preparation method and a product of a lithium-ion battery electrode sheet with vertical vent structures. Characteristics of the lithium-ion battery electrode sheet itself and process characteristics of lithium-ion transmission are combined, and a thermal decomposition additive with a specific proportion content and a specified particle size is used as a composition of an electrode slurry. Further, an evaporation rate of a solvent and a decomposition rate of the thermal decomposition additive are required to be controlled such that the thermal decomposition additive may be completely decomposed and consumed after the solvent is completely evaporated. In this way, the electrode slurry is unable to flow autonomously and thus fills up a plurality of vertical vents formed by the decomposition of the thermal decomposition additive, and the lithium-ion battery electrode sheet with the vertical vent structure is accordingly prepared and obtained. The lithium-ion battery electrode sheet provided by the disclosure has a plurality of vertical vent structures, and the vertical vent structures are uniformly distributed. When being transmitted, the lithium-ions in the electrolyte may be efficiently transmitted to the inside of the electrode through the less-tortuous and oriented vertical vent structures and then further penetrate into the active particles through the vertical vent structures on the side, and as such, the overall transmission efficiency of liquid ions in the porous electrode is improved.

To realize the above purpose, according to one aspect of the disclosure, a preparation method of a lithium-ion battery electrode sheet with vertical vent structures is provided and includes the following steps.

Step one: a powdered thermal decomposition additive, an active material, a binder, and a conductive agent are added into a solvent according to a predetermined ratio and a specific order, continuous stirring is performed until the solvent is uniformly mixed, and an electrode slurry is obtained. Herein, mass of the thermal decomposition additive is 10 wt % to 30 wt % of total mass of a solid matter.

Step two: the electrode slurry prepared and obtained in step one is coated onto a current collector to obtain a lithium-ion battery wet electrode sheet.

Step three: the lithium-ion battery electrode sheet is heated and dried. Herein, one side coated with the electrode slurry is required to be vertically placed upwards during heating and drying, and an evaporation rate of the solvent and a decomposition rate of the thermal decomposition additive are required to be controlled such that the thermal decomposition additive is completely decomposed and consumed after the solvent is completely evaporated. In this way, the electrode slurry is unable to flow autonomously and thus fills up a plurality of vertical vents formed by the decomposition of the thermal decomposition additive, and the lithium-ion battery electrode sheet with the vertical vent structures is accordingly prepared and obtained.

Preferably, in step one, a decomposition temperature of the thermal decomposition additive is between room temperature and a drying temperature after the lithium-ion battery electrode sheet is coated. The thermal decomposition additive is completely decomposed during heating and drying so that gas is generated, the gas escapes in a thickness direction of the lithium-ion battery electrode sheet, and so that vertical vents are formed.

Preferably, in step one, the thermal decomposition additive is one or more of $NH_4HCO_3$, urea, and $NaHCO_3$. The thermal decomposition additive that is uniformly-mixed and fine powdered may be prepared and obtained through a grinding method or a saturated solution precipitation method, or particles of the thermal decomposition additive may be ground under irradiation of an infrared lamp to obtain the powdered thermal decomposition additive.

Preferably, step one further includes the following steps: the thermal decomposition additive is added to a colloidal solution formed by mixing of the solvent and the binder for stirring, and after uniform dispersion is achieved, the active material and the conductive agent are added for mixing to improve dispersion uniformity of the thermal decomposition additive in the electrode slurry. Herein, a coating thickness of the electrode slurry is 100 μm to 2,000 μm.

Preferably, when the solvent and the binder are mixed, magnetic stirring at a rotation speed of 300 r/min to 500 r/min is performed for 20 minutes to 40 minutes to prepare and obtain the uniform colloidal solution, and the thermal decomposition additive is then added into the colloidal solution and is magnetically stirred at 400 r/min to 800 r/min for 10 minutes to 40 minutes, or the thermal decomposition additive may also be dispersed by ultrasound after being added to the colloidal solution. Magnetic stirring is performed at 400 r/min to 600 r/min for 4 hours to 8 hours when the active material and the conductive agent are added for mixing.

Preferably, the heating and drying is performed through vacuum drying, a heating and drying temperature is 60° C. to 100° C., and heating and drying time is 5 hours to 8 hours.

Preferably, the active material is lithium nickel cobalt manganese oxide, lithium iron phosphate, lithium cobalt oxide, lithium manganese oxide, or graphite, the binder is polyvinylidene fluoride, the conductive agent is carbon black, and the solvent is N-methylpyrrolidone.

Preferably, an equivalent diameter of the vertical vent structures is less than 100 microns.

According to another aspect of the disclosure, a lithium-ion battery electrode sheet with vertical vent structures is provided and includes a current collector, an electrode coating layer disposed on the current collector, and a plurality of vertical vent structures uniformly distributed in the electrode coating layer. The vertical vent structures are obtained through thermally decomposition of a thermal decomposition additive.

Preferably, a thickness of the electrode coating layer is 50 μm to 500 μm, and an equivalent diameter of the vertical vent structures is less than 100 microns.

In general, the above technical solutions provided by the disclosure have the following technical advantages compared to the related art.

1. A thermal decomposition additive with a specific proportion content and a specified particle size is used as the composition of the electrode slurry in the disclosure. Further, the evaporation rate of the solvent and the decomposition rate of the thermal decomposition additive are required to be controlled, such that the thermal decomposition additive is completely decomposed and consumed after the solvent is completely evaporated. In this way, the electrode slurry is unable to flow autonomously and thus fills up the plurality of vertical vents formed by the decomposition of the thermal decomposition additive, and the lithium-ion battery electrode sheet with the vertical vent structures is accordingly prepared and obtained. The lithium-ion battery electrode sheet provided by the disclosure has a plurality of vertical vent structures, and the vertical vent structures are uniformly distributed. When being transmitted, the lithium-ions in the electrolyte may be efficiently transmitted to the inside of the electrode through the less-tortuous and oriented vertical vents and then further penetrate into the active particles through the vertical vent structures on the side, and as such, the overall transmission efficiency of liquid ions in the porous electrode is improved. The preparation method provided by the disclosure requires low costs and a simple process and exhibits good compatibility with currently-available industrial methods, so large-scale manufacturing of the electrode with this special structure may be realized without replacing the existing process and equipment.

2. The decomposition temperature of the thermal decomposition additive provided by the disclosure is between the room temperature and the drying temperature after the lithium-ion battery electrode sheet is coated, and gas is generated during thermal decomposition. In this way, the electrode slurry is unable to flow autonomously and thus fills up the plurality of vertical vents formed by the decomposition of the thermal decomposition additive, and the lithium-ion battery electrode sheet with the vertical vent structures is accordingly prepared and obtained.

3. The thermal decomposition additive provided by the disclosure is a uniform and fine powder and may be uniformly mixed in the electrode slurry. Further, thermal decomposition is performed between the room temperature and the drying temperature after the lithium-ion battery electrode sheet is coated to generate gas, and the gas may form uniformly arranged vertical vent structures in the electrode slurry. When being transmitted, the lithium-ions in the electrolyte may be efficiently transmitted to the inside of the electrode through the less-tortuous and oriented vertical vents and then further penetrate into the active particles through the vertical vent structures on the side, and as such, the overall transmission efficiency of liquid ions in the porous electrode is improved.

4. The proportioning and mixing process of the powdered thermal decomposition additive, the active material, the binder, and the conductive agent are specifically designed, and accordingly, the prepared and obtained decomposition additive in the electrode slurry may be uniformly distributed.

5. The heating and drying method in the disclosure is far-infrared radiation drying, double-sided air supply suspension drying, or hot air convection drying, the heating and drying temperature is 60° C. to 100° C., and the heating and drying time is 5 hours to 8 hours. Further, one side coated with the electrode slurry is required to be vertically placed upwards during heating and drying, and in this way, the electrode slurry is unable to flow autonomously and thus fills up the plurality of vertical vents formed by the decomposition of the thermal decomposition additive.

BRIEF DESCRIPTION OF THE DRAWINGS

In the drawing, the same reference numerals are used to represent identical or similar elements, and 1 is a lithium-ion battery electrode sheet, 2 is a current collector, 3 is an electrode coating layer, 4 is a thermal decomposition additive, and 5 is vertical vent structures.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

Figure 1:
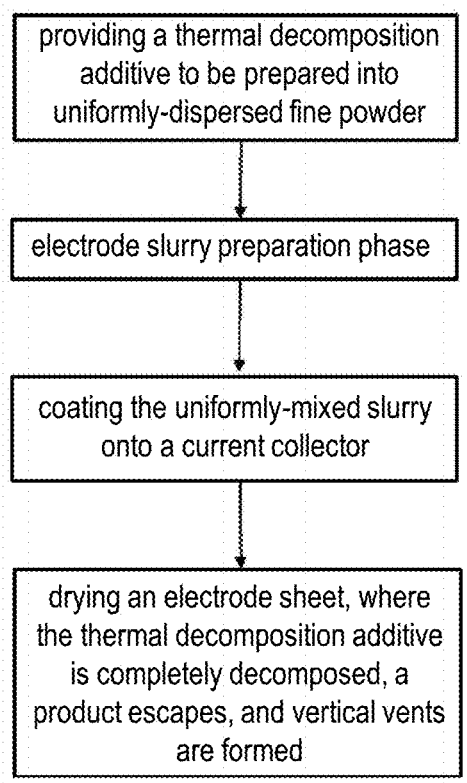
FIG. 1 is a flow chart of a preparation method of a lithium-ion battery electrode sheet with vertical vent structures according an embodiment of the disclosure.
Figure 2:
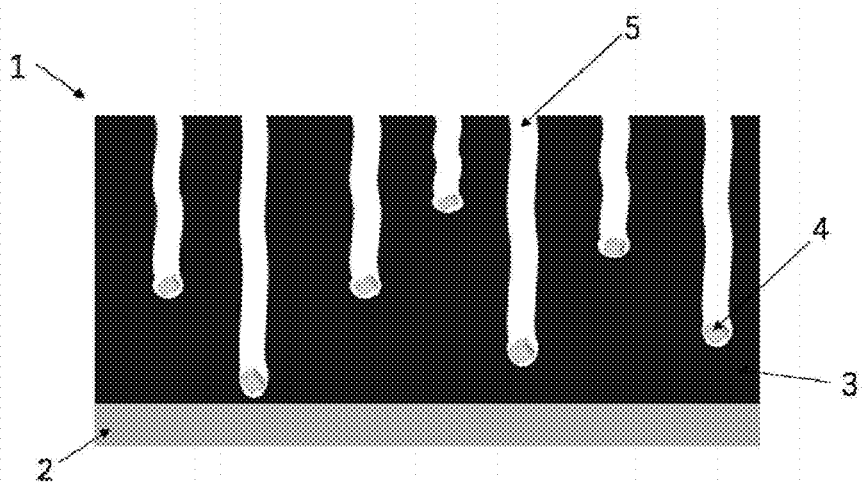
FIG. 2 is a schematic diagram of a structure of the prepared lithium-ion battery electrode sheet with the vertical vent structures according to an embodiment of the disclosure.
Figure 3:
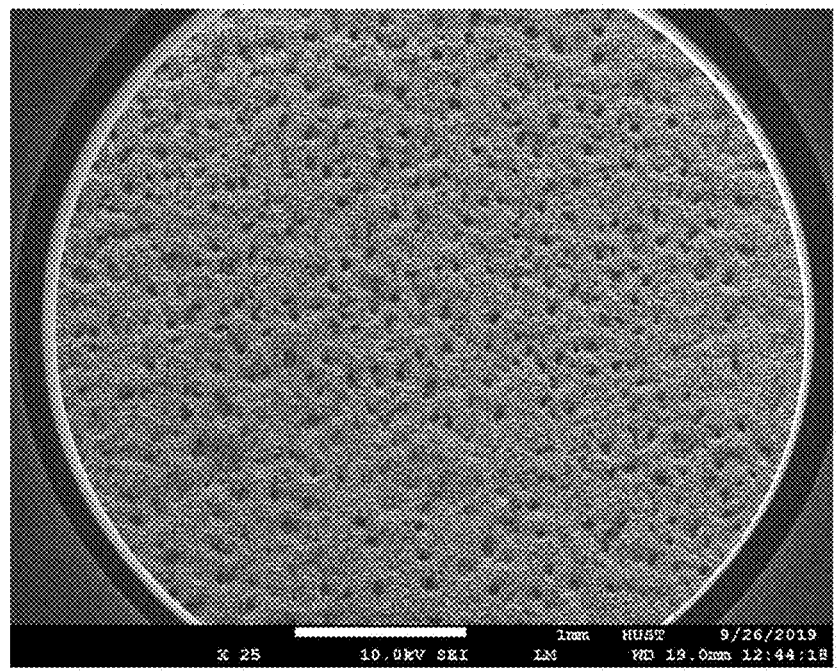
FIG. 3 is a scanning electron micrograph of a surface of the lithium-ion battery electrode sheet with the vertical vent structures according to an embodiment of the disclosure.
Figure 4:
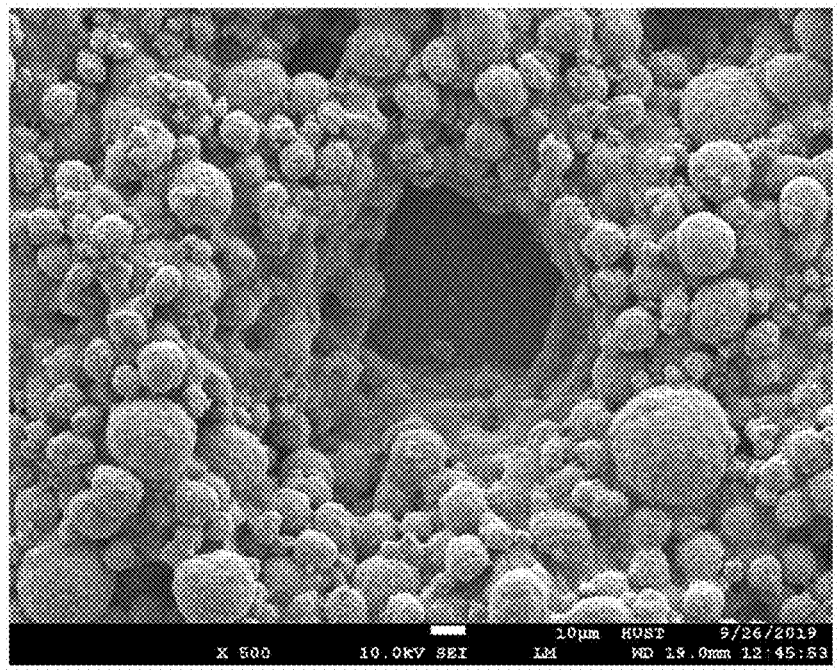
FIG. 4 is a local enlargement view of the surface of the lithium-ion battery electrode sheet with the vertical vent structures according to an embodiment of the disclosure.
Figure 5:
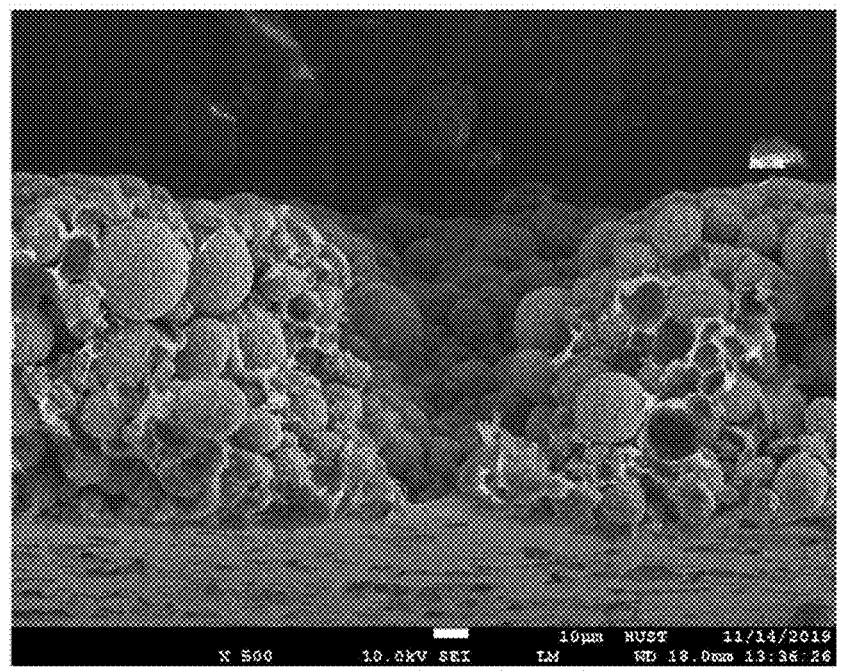
FIG. 5 is a scanning electron micrograph of a cross-section of the lithium-ion battery electrode sheet with the vertical vent structures according to an embodiment of the disclosure.

With reference to FIG. 1, the embodiments of the disclosure provide a preparation method of a lithium-ion battery electrode sheet with vertical vent structures. A lithium-ion battery electrode sheet 1 includes a current collector 2 and an electrode slurry layer 3, and a thermal decomposition additive 4 is added to the slurry. In a sheet drying phase, the thermal decomposition additive 4 is thermally decomposed, and the generated gas escapes upwards in a thickness direction of the sheet, and vertical vent structures 5 are thereby formed.

Further, since the thermal decomposition additive 4 is uniformly distributed in the slurry, the prepared vent structures obtained after decomposition is also uniformly distributed on the sheet surface, and an equivalent diameter of each of the vents is approximately tens of microns, not more than 100 microns.

The embodiments of the disclosure mainly include the following steps.

Step one: the thermal decomposition additive 4 is provided and is made into a powder form.

Preferably, a decomposition temperature range of the thermal decomposition additive 4 is higher than a normal temperature and is lower than a drying temperature (generally 100° C. to 120° C.) after coating of the lithium-ion battery electrode sheet in the prior art, and one or more of $NH_4HCO_3$, urea, and $NaHCO_3$ is adopted for the thermal decomposition additive 4 provided by the disclosure.

Preferably, in an embodiment, the uniformly-mixed and fine powdered thermal decomposition additive 4 may be prepared and obtained through a grinding method or a saturated solution precipitation method. Ammonium bicarbonate particles may also be ground into fine powder under infrared light irradiation, and ammonium bicarbonate powder of different particle sizes may be prepared by controlling the grinding time.

Step two: the powdered thermal decomposition additive 4, an active material, a binder, and a conductive agent are added into a solvent according to a predetermined ratio and a specific order and are continuous stirred until the solvent is uniformly mixed, and an electrode slurry is obtained. Mass of the thermal decomposition additive 4 is 10 wt % to 30 wt % of total mass of a solid matter.

Preferably, the thermal decomposition additive 4 may be added to a colloidal solution formed by mixing of the solvent and the binder for stirring first, and the active material and the conductive agent are added for mixing after uniform dispersion is achieved to improve dispersion uniformity of the thermal decomposition additive 4 in the electrode slurry. In this embodiment, the binder and the solvent are mixed first and are magnetically stirred at a rotation speed of 300 r/min to 500 r/min for 20 minutes to 40 minutes to prepare and obtain the colloidal solution. The thermal decomposition additive 4 is then added into the colloidal solution and is magnetically stirred at 400 r/min to 800 r/min for 10 minutes to 40 minutes, and dispersion may also be performed through ultrasound. The active material and the conductive agent are then added and are magnetically stirred at 400 r/min to 600 r/min for 4 hours to 8 hours.

Preferably, the current industrial mechanical stirring manner and stirring equipment thereof may also be directly adopted to perform such stirring.

Step three: the electrode slurry prepared and obtained in step one is coated onto a current collector to obtain a lithium-ion battery wet electrode sheet, and a coating thickness of the electrode slurry is 100 μm to 2,000 μm.

Preferably, the currently-available industrial slit coating or transfer coating and coating machine thereof may be directly adopted for such process and equipment, and the current collector 2 is copper foil (cathode) or aluminum foil (anode). In this embodiment, a laboratory scraper is used for slurry coating, and a coating thickness is 500 μm to 1,000 μm.

Step four: the lithium-ion battery wet electrode sheet is heated and dried, one side coated with the electrode slurry is required to be vertically placed upwards during heating and drying, and an evaporation rate of the solvent and a decomposition rate of the thermal decomposition additive 4 are required to be controlled such that the thermal decomposition additive 4 may be completely decomposed and consumed after the solvent is completely evaporated. In this way, the electrode slurry is unable to flow autonomously and thus fills up the plurality of vertical vents 5 formed by the decomposition of the thermal decomposition additive 4, and the lithium-ion battery electrode sheet with the vertical vent structures is accordingly prepared and obtained.

Herein, note that regardless of the drying process used, a surface of the electrode sheet 1 to be dried is required to face upwards, and the drying process parameters (e.g., temperature and wind speed) are required to be used to control the evaporation rate of the solvent and the decomposition rate of the thermal decomposition additive 4, so that the thermal decomposition additive 4 is completely decomposed and consumed after the solvent is evaporated to a certain amount or is completely evaporated. The evaporation of the solvent to a certain amount means that a solid content of the slurry or viscosity of the slurry rises to a certain value, so that the slurry cannot flow autonomously and fills up the vertical vents 5 formed by the thermal decomposition additive 4.

Preferably, the currently-available mainstream drying technology in the industry, such as far-infrared radiation drying, double-sided air supply suspension drying, and conventional hot air convection drying may be directly adopted for such process and equipment. In this embodiment, a vacuum drying oven is used for vacuum drying at 60° C. to 100° C. for 5 hours to 8 hours.

It can be understood that the thermal decomposition material provided by the disclosure is not limited to ammonium bicarbonate, and the method used in the embodiments is only one of the feasible solutions.

The preparation method of the lithium-ion battery electrode sheet with the vertical vents provided by the disclosure may be used for the preparation of lithium iron phosphate, a ternary material, a lithium manganese oxide or lithium cobalt oxide anode electrode sheet, or a graphite cathode electrode sheet and may be used to improve transmission of lithium ions and enhance ion conductivity.

A commonly-used material system for manufacturing the anode electrode of a lithium-ion battery is used in this example, the active material is lithium nickel cobalt manganate (NMC), the binder is polyvinylidene fluoride (PVDF), the conductive agent is conductive carbon black (Super-P), and the solvent N-methylpyrrolidone (NMP).

With reference to FIG. 2, FIG. 3, FIG. 4, and FIG. 5, the electrode sheet prepared and obtained through this embodiment is observed under a scanning electron microscope, the vertical vents with evenly distributed electrode surfaces can be seen, and an equivalent diameter is approximately tens of microns.

In order to more clearly introduce the preparation method of the lithium-ion battery electrode sheet with the vertical vents provided by the embodiments of the disclosure in detail, description is provided as follows together with specific examples.

Example 1

(1) Preparation of ammonium bicarbonate powder: required ammonium bicarbonate was placed in a mortar and was thoroughly ground under infrared light irradiation until the ammonium bicarbonate powder was fine and dry and was in a state of uniform dispersion without agglomeration and adhesion.

(2) Preparation of slurry: 0.1 g PVDF was added to 2 g NMP and was stirred at a low speed of 300 rpm for 30 minutes until PVDF was fully dissolved and a colloidal solution was formed. 1 g of the fine powder ground in step (1) was add to the obtained PVDF and NMP mixed colloidal solution and was stirred at a rotation speed of 500 rpm for 30 minutes to allow the ammonium bicarbonate to be uniformly mixed. 0.1 g of the conductive agent Super-P was added, stirring was continuously performed at 500 rpm for 30 minutes, and after complete dispersion, 2 g of NMC was finally added and was stirred at 500 rpm for 6 hours.

(3) Coating of slurry: selected 20 μm thick current collector aluminum foil was placed flat on a glass piece, a little amount of alcohol was smeared on the glass piece in advance to improve adhesion between the glass piece and the aluminum foil, and the prepared and obtained slurry was transferred onto the aluminum foil and was coated with a 500 μm thick scraper.

(4) Drying of an electrode sheet: the coated electrode sheet was placed in a vacuum dryer for drying. The drying temperature was 80° C. and the drying time was 5 hours to allow the solvent to be completely evaporated, the ammonium bicarbonate to be completely decomposed and escaped, and vertical vents were formed.

Example 2

(1) Preparation of ammonium bicarbonate powder: a saturated aqueous solution of ammonium bicarbonate was prepared and was fully stirred, isopropanol was slowly added to the saturated aqueous solution to gradually precipitate ammonium bicarbonate crystals, and fine ammonium bicarbonate powder with uniform dispersion without agglomeration and adhesion was obtained.

(2) Preparation of slurry: 0.1 g PVDF was added to 2 g NMP and was stirred at a rotation speed of 400 rpm for 20 minutes until PVDF was fully dissolved and a colloidal solution was formed. 0.8 g of the ammonium bicarbonate powder precipitated in step (1) was added to the obtained PVDF and NMP mixed colloidal solution and was stirred at a rotation speed of 700 rpm for 30 minutes to allow the ammonium bicarbonate to be uniformly mixed. 0.1 g of the Super-P was added, stirring was continuously performed at 600 rpm for 30 minutes, and after complete dispersion, 2 g of NMC was finally added and was stirred at 500 rpm for 7 hours.

(3) Coating of slurry: selected 20 μm thick current collector aluminum foil was placed flat on a glass piece, a little amount of alcohol was smeared on the glass piece in advance to improve adhesion between the glass piece and the aluminum foil, and the prepared and obtained slurry was transferred onto the aluminum foil and was coated with a 800 μm thick scraper.

(4) Drying of an electrode sheet: the coated electrode sheet was placed in a vacuum dryer for drying, the drying temperature was 60° C., and the drying time was 6 hours.

The method provided by the disclosure is not limited to the preparation of the anode electrode sheet of a lithium-ion battery, and for the cathode electrode sheet, the following example is provided.

Example 3

A commonly-used material system for manufacturing the cathode electrode of a lithium-ion battery is used in this example, the active material is graphite, the binder is water-based binder LA133, the conductive agent is Super-P, and the solvent is water.

(1) Preparation of ammonium bicarbonate powder: a saturated aqueous solution of ammonium bicarbonate was prepared and was fully stirred, isopropanol was slowly added to the saturated aqueous solution to gradually precipitate ammonium bicarbonate crystals, and fine ammonium bicarbonate powder with uniform dispersion without agglomeration and adhesion was obtained.

(2) Preparation of slurry: 0.12 g LA133 was added to a 3 g saturated aqueous solution of ammonium bicarbonate and was stir at a rotation speed of 400 rpm for 20 minutes until LA133 was fully dissolved. 0.6 g of the ammonium bicarbonate powder precipitated in step (1) was added to the obtained LA133 and the saturated aqueous solution of ammonium bicarbonate and was stirred at 600 rpm for 30 minutes to allow the ammonium bicarbonate to be uniformly mixed. 0.12 g of the Super-P was added, stirring was continuously performed at 600 rpm for 30 minutes, and after complete dispersion, 1 g of graphite was finally added and was stirred at 500 rpm for 8 hours.

(3) Coating of slurry: selected 9 μm thick current collector copper foil was placed flat on a glass piece, a little amount of alcohol was smeared on the glass piece in advance to improve adhesion between the glass piece and the copper foil, and the prepared and obtained slurry was transferred onto the copper foil and was coated with a 800 μm thick scraper.

(4) Drying of an electrode sheet: the coated electrode sheet was placed in a dryer for drying, the drying temperature was 100° C., and the drying time was 8 hours.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A preparation method of a lithium-ion battery electrode sheet with vertical vent structures, comprising:
    step one: adding a powdered thermal decomposition additive, an active material, a binder, and a conductive agent into a solvent performing continuous stirring until the solvent is uniformly mixed to obtain an electrode slurry, wherein a mass of the thermal decomposition additive is 10 wt % to 30 wt % of a total mass of solid matter;
    step two: coating the electrode slurry prepared and obtained in step one onto a current collector to obtain a lithium-ion battery wet electrode sheet;
    step three: heating and drying the lithium-ion battery wet electrode sheet in a way that one side coated with the electrode slurry is required to be vertically placed upwards during heating and drying, and an evaporation rate of the solvent and a decomposition rate of the thermal decomposition additive are controlled such that the thermal decomposition additive is completely decomposed and consumed after the solvent is completely evaporated, and wherein the electrode slurry is unable to flow autonomously to fill up a plurality of vertical vents formed by the decomposition of the thermal decomposition additive, and so that the lithium-ion battery electrode sheet with vertical vent structures is prepared and obtained,
    wherein step one further comprises: adding the thermal decomposition additive to a colloidal solution formed by mixing of the solvent and the binder for stirring, after uniform dispersion is achieved, adding the active material and the conductive agent for mixing to improve dispersion uniformity of the thermal decomposition additive in the electrode slurry,
    wherein during mixing of the solvent and the binder, magnetic stirring at a rotation speed of 300 r/min to 500 r/min is performed for 20 minutes to 40 minutes to prepare and obtain the uniform colloidal solution, and the thermal decomposition additive is then added into the colloidal solution and is magnetically stirred at 400 r/min to 800 r/min for 10 minutes to 40 minutes, or the thermal decomposition additive is dispersed by ultrasound after being added to the colloidal solution, and magnetic stirring is performed at 400 r/min to 600 r/min for 4 hours to 8 hours when the active material and the conductive agent are added for mixing.

2. The preparation method according to claim 1, wherein in step one, a decomposition temperature of the thermal decomposition additive is between room temperature and a drying temperature after the lithium-ion battery electrode sheet is coated, and the thermal decomposition additive is completely decomposed during heating and drying so that gas is generated, and the gas escapes in a thickness direction of the lithium-ion battery electrode sheet, and so that vertical vents are formed.

3. The preparation method according to claim 1, wherein in step one, the thermal decomposition additive is one or more of $NH_4HCO_3$, urea, and $NaHCO_3$, and the thermal decomposition additive that is fine powdered is prepared and obtained through a saturated solution precipitation method or grinding under irradiation of an infrared lamp.

4. The preparation method according to claim 1, wherein a coating thickness of the electrode slurry is 100 μm to 2,000 μm.

5. The preparation method according to claim 1, wherein the heating and drying is performed through vacuum drying, a heating and drying temperature is 60° C. to 100° C., and heating and drying time is 5 hours to 8 hours.

6. The preparation method according to claim 1, wherein the active material is lithium nickel cobalt manganese oxide, lithium iron phosphate, lithium cobalt oxide, lithium manganese oxide, or graphite, the binder is polyvinylidene fluoride, the conductive agent is carbon black, and the solvent is N-methylpyrrolidone.

7. The preparation method according to claim 1, wherein an equivalent diameter of the vertical vent structures is less than 100 microns.

* * * * *